(12) United States Patent
Khvilivitzky

(10) Patent No.: US 8,412,666 B1
(45) Date of Patent: Apr. 2, 2013

(54) METHOD FOR LOGICAL PROCESSING OF CONTINUOUS-VALUED LOGICAL SIGNALS

(76) Inventor: Michael S. Khvilivitzky, Coconut Creek, FL (US)

( * ) Notice: Subject to any disclaimer, the term of this patent is extended or adjusted under 35 U.S.C. 154(b) by 0 days.

(21) Appl. No.: 13/337,516

(22) Filed: Dec. 27, 2011

Related U.S. Application Data

(60) Provisional application No. 61/460,083, filed on Dec. 27, 2010.

(51) Int. Cl.
*H03K 3/02* (2006.01)
(52) U.S. Cl. .......................................................... 706/52
(58) Field of Classification Search ...................... 706/52
See application file for complete search history.

(56) References Cited

U.S. PATENT DOCUMENTS

| | | | |
|---|---|---|---|
| 4,914,614 A | 4/1990 | Yamakawa | |
| 5,077,677 A | 12/1991 | Murphy et al. | |
| 5,227,993 A | 7/1993 | Yamakawa | |
| 5,398,199 A | 3/1995 | Lefons | |
| 5,463,571 A | 10/1995 | Kim et al. | |
| 5,463,572 A | 10/1995 | Kim et al. | |
| 5,770,966 A * | 6/1998 | Mills | 327/355 |
| 5,799,296 A | 8/1998 | Wang | |
| 6,133,754 A | 10/2000 | Olson | |
| 7,355,444 B2 | 4/2008 | Lablans | |

OTHER PUBLICATIONS

Yamakawa, T., Miki, T., Ueno, F., Electronics and Communications in Japan, Part 2, vol. 68, No. 2, 1986, vol. 67_C. No. 12, Dec. 1984, pp. 1027-1029.*
U.S. Appl. No. 12/422,491, filed Apr. 13, 2009, N. Gershenfeld et al.

* cited by examiner

*Primary Examiner* — Jeffrey A. Gaffin
*Assistant Examiner* — Ola Olude Afolabi

(57) ABSTRACT

The present invention provides computational means for calculating values of continuous-valued logical functions, which are uniquely defined and deterministic, while compatible with their discrete counterparts. The invention supports logical processing of arbitrary logical functions of arbitrary number of input variables. The proposed algorithm utilizes a series of multiplications, number of which is proportional to a number of input variables and a number of maxterms. It allows of minimizing the computation time while excluding a more elaborate disjunction operation. The present invention can be implemented in software of microprocessors, microcontrollers, DSP, or general computers, and it can also be built as a stand-alone or a set of digital, analog, or mixed-signal ICs.

9 Claims, 3 Drawing Sheets

METHOD FOR LOGICAL PROCESSING OF CONTINUOUS-VALUED LOGICAL SIGNALS

RELATED APPLICATIONS

The present application is a continuation-in-part application of U.S. provisional patent application Ser. No. 61/460,083, filed Dec. 27, 2010, for METHOD FOR DETERMINISTIC DEFINITION OF CONTINUOUS-VALUED LOGICAL FUNCTIONS, by Michael S. Khvilivitzky, included by reference herein and for which the benefit of the priority date is hereby claimed.

FIELD OF THE INVENTION

The present invention relates to algebraic logic and, more particularly, to assess the values of continuous-valued logical functions. Continuous-valued logic is used in various applications of artificial intelligence such as fuzzy logic, and neural networks.

BACKGROUND OF THE INVENTION

This invention relates to an area of logical processing of continuous signals. While regular Boolean logic deals with two discrete (crisp) signals 0 and 1, which are usually designate two (False and Truth) values, the continuous-valued logic operates on any value in closed interval between real numbers 0 and 1 including the interval's endpoints. Any continuous electrical signal can be normalized and brought to this interval, i.e. made a continuous-valued logical signal. Such signals are usually considered to be equivalent to probability, or degree of truth, or degree of participation. Since this kind of algebraic logic employs probabilistic disjunction, it is commonly referred to as probabilistic logic (Nilsson, N.J., 1986, *Probabilistic logic,* Artificial Intelligence 28(1): 71-87). The continuous-valued logic is not the same as multi-valued (or many-valued) logic. The difference is in the fact that usually the multi-valued logic is understood as a logic that deals with a countable but finite number of states: for example, three (in a case of ternary logic), or four, or as a radix of any other counting system. Otherwise, the continuous-valued logic is a logic, which has an indefinite number of states.

Continuous-valued logic is a kind of algebraic logic that uses algebraic formulas to express underlying logical operations. The simplest and effective enough set of three basic algebraic logical operations usually contains: product conjunction $z=x$ AND $y=xy$, probabilistic disjunction $z=x$ OR $y=x+y-xy$, and Godel's negation $z=$NOT $x=1-x$ or $z=$NOT $y=1-y$. These operations can be implemented either in analog or in digital form.

A major problem associated with the logical processing of continuous signals is that they do not exactly follow the same rules as a regular Boolean logic, necessitating many special considerations to be taken into account, such as:
  (a) Uncertainty—It is possible to define a large and indefinite number of continuous-valued logical functions that satisfy discrete Boolean truth tables (at the interval endpoints 0 and 1). Therefore, continuous logical functions are not standardized, not repeatable and not deterministic expressions.
  (b) Speed—Despite its simplistic appearance, the use of probabilistic disjunction is associated with an increase of computational time which is especially significant when a large number of input variables involved.
  (c) Compatibility—Continuous-valued logical expressions have to cover both continuous signals inside their domains and discrete signals at the endpoints of this interval as well.
  (d) Ambiguity—What method to apply while generating the continuous logical functions. Although it is known that some such functions are polynomials, it is still questionable how to define these polynomials in order to lower their degree.

A significant number of existing art solutions (U.S. Pat. Nos. 5,398,199, 6,133,754, and 7,355,444) relate to logical processing of multi-valued, but not continuous-valued signals. Many of existing art solutions (U.S. Pat. Nos. 5,463,565 and 5,463,572) while also being multi-valued are suitable to a single specific logical function like AND and OR but not for assessing any required functions. An effort has been made to propose universal logical processors (ALU) capable of generating various logical functions (U.S. Pat. Nos. 4,914,614 and 5,227,993), however these solutions also relate only to the multi-valued and not to the continuous-valued logic.

Mills (U.S. Pat. No. 5,770,966) shows diode and transistor analog logical arrays compounded of continuous Lukaciewicz implication and negated implication circuits. Such arrays model a human eye retina. Wang (U.S. Pat. No. 5,799,296) proposed a logical system using real-time neural network comprised of continuous variables that do not utilize membership functions and employ an approximation of a neuron with a multiplier. All these solutions are based on the use of simple basic logical operations (in order to improve level of integration) and are often realized as analog circuits (in order to increase speed). Gershenfeld (application for U.S. patent Ser. No. 12/422,491) proposed an array of analog circuits which incorporated statistical signal processing. In this solution, probabilities were assigned to certain combinations of two Boolean logical input variables (00, 01, 10, and 11) and used in the logical processing cell (i.e. probabilities, with which these combinations of discrete logical signals came, were processed).

Of a special interest is a logical processing unit capable of handling continuous-valued signals such as the above mentioned ALU for multi-valued logic. Such universal logical processor could be used in various applications that involve artificial intelligence, logical reasoning, neural networks, and fuzzy control. Murphy (U.S. Pat. No. 5,077,677) has proposed a probabilistic inference gate that processes probabilities of certain events (which are continuous signals) while treating them as logical entities. In this solution, any relationship has to be expressed in terms of probabilistic implications. Although effective in some specific situations, particularly in those, at which experts' reasoning inference is approximated, generally there are several drawbacks associated with this approach:
  (a) Logical functions are not expressed in standard algebraic form;
  (c) Such probabilistic implication functions are not always compatible with Boolean discrete logical functions at endpoints of logical interval;
  (d) These functions disallow to be expressed as disjunctions of maxterms (in DNF) or conjunctions of maxterms (in CNF);
  (e) Such defined logical functions do not follow De Morgan laws and therefore cannot be used in the functions' simplification process;
  (f) Definitions of these multi-staged implications are increasingly complicated in cases of larger number of input variables.

It is common practice to define the Boolean (discrete) logical functions while using DNF or CNF. However, it has been neither demonstrated that the use of the CNF and DNF in association with the continuous-valued logic brings important advantages nor shown how to define such functions this way. Theory establishing relationships among such continuous-valued objects as direct and negated logical functions, their minterms and maxterms, and continuous input signals is in process of development.

In the prior art, no standard method for deterministic definition of continuous logical functions was proposed. Existing art solutions disallow of construction of universal logical processor capable of generating arbitrary continuous-valued logical functions. Also, proposed earlier solutions are often not uniquely defined and not guarantee repeatable results in some circumstances. Usually, the existing art solutions are not optimized for performance (not guarantee the minimum execution time). As a result, none of the existing art solutions can be characterized by a set of features to be considered a standardized continuous-valued logic, even though they might meet the requirements of some applications.

It is, therefore, an object of the invention to guarantee compatibility between continuous and discrete logical functions.

It is an object of the invention as well to provide a universal logical processor to handle any practical arbitrary number of continuous input variables and deliver arbitrary continuous logical function.

It is also an object of the invention to provide a logical processor capable of defining the continuous logical functions with complete determinism while guaranteeing minimum processing time.

It is further an object of the invention as well to provide a continuous-valued logical processor that adheres to CNF and DNF rules similar to regular Boolean logic.

SUMMARY OF THE INVENTION

This invention provides a method for calculating values of the continuous-valued logical functions while using the Conjunctive Normal Form (CNF) and Disjunctive Normal Form (DNF). Continuous-valued Boolean logic is probabilistic logic distinguishing by that its direct and negated expressions are correspondingly constructed using DNF or CNF rules. At such representation, respectively, direct logical functions $A_i$ are disjunctions of minterms $m_k$ (the functions defined in DNF) and negated logical functions NOT $A_i$ are conjunctions of maxterms $M_k$ (the functions defined in CNF).

A minterm is conjunction of a full set of input variables, each of which is taken either in direct or in negated form. Minterms are atoms of respective DNF logical functions, i.e. logical functions containing a single minterm only. A maxterm is disjunction of a full set of input variables, each of which is taken either in direct or negated form. Maxterms are atoms of respective CNF logical functions, i.e. logical functions containing a single maxterm only. DNF logical function is a disjunction of various minterms, whilst a full set of logical functions comprises all possible combinations of minterms. Algebraic probabilistic logical functions can be expressed with polynomials. A degree of the DNF continuous-valued polynomial $A_i$ is equal to a number of underlying minterms $m_k$. CNF logical function is a conjunction of various maxterms, whilst a full set of logical functions comprises all possible combinations of maxterms. A degree of the CNF continuous-valued polynomial NOT $A_i$ is equal to a number of underlying maxterms $M_k$.

We have demonstrated that this method provides the following:
(a) Minterms $m_k$ are equal to direct logical functions $A_i$ while the maxterms $M_k$ are equal to negated logical functions NOT $A_i$, where i are powers of 2;
(b) Minterms $m_k$ and maxterms $M_k$ of discrete and continuous logics are the same;
(c) Maxterms $M_k$ are negations of corresponding minterms $m_k$ and vice-versa;
(d) Minterms $m_k$ and maxterms $M_k$ of any number of input variables are first-degree irreducible polynomials;
(e) Total number of minterms $m_k$ or maxterms $M_k$ is equal to $2^n$;
(f) Direct logical functions $A_i$ are negations of negated logical functions NOT $A_i$ and vice versa;
(g) Continuous direct logical functions $A_i$ are polynomials, degree of which is equal to a number of underlying minterms $m_k$;
(h) All higher order members of logical polynomials $A_i$ vanish at the "logical cube" vertices (at the logical interval ends);
(i) While negated logical functions NOT $A_i$ can be factored (represented as conjunctions) of corresponding maxterms $M_k$, their indices i can be represented as a sum of 2 in powers equal indices k;
(j) Continuous logical functions, defined in DNF and CNF, satisfy both De Morgan laws, which allow for not using the more complicated algebraic formula for disjunction but using simpler conjunction and negation instead.

Let us look how to calculate a value of arbitrary continuous DNF logical function, while using its CNF form and utilizing only two basic logical operations, conjunction and negation, for faster execution. For example, in a case it is needed to assess continuous-valued exclusive OR function: $A_6 = x_1$ XOR $x_0$ according to this invention, the following steps would have to be taken:

(a) We look at binary code for the index i=6, which is 0110. In other words, $6 = 2^2 + 2^1$. Since the code's binary digits k=2 and k=1 are equal to 1, while assessing the CNF logical function's NOT $A_i$ value as conjunction (product) of corresponding maxterms, we include two maxterms $M_2$ and $M_1$. As a result, NOT $A_6 = (M_2)$ AND $(M_1) = (M_2)(M_1)$.

(b) Every maxterm value can be obtained from a value of corresponding minterm, such as: $M_2$=NOT $m_2$ while $M_1$=NOT $m_1$.

(c) Underlying minterms can be assessed while looking at binary code of the index i. In a case, it is i=0110, i.e. it contains two binary digits k=2 and k=1. Thus, for the minterm $m_2$, we have binary code of k=2, which is 10. This code points out that one of input variables has to be included in its direct form and another—in negated form, in other words as $x_1$ and NOT $x_0$. The corresponding minterm is a conjunction (product) of these values, i.e. $m_2 = (x_1)$ AND (NOT $x_0$) = $(x_1)$ (NOT $x_0$). Another minterm can be assessed similarly: since its index k=1, its binary code is 01, and therefore, the variable $x_1$ is taken in its negated form and the variable $x_0$—in its direct form. As a result, $m_1$=(NOT $x_1$) AND $(x_0)$=(NOT $x_1$) $(x_0)$.

(d) Finally, the function $A_6$ can be evaluated while applying negation to the obtained earlier value of NOT $A_6$ one more time.

In a case there is a need to determine a value of arbitrary continuous logical function $A_i$, while an arbitrary number of input variables n, an index i of the function, and values of all input variables $x_j$ are given, the values of all underlying minterms $m_k$ can be calculated as conjunctions of direct or negated input variables $x_j$ and AND-ed. After that, each minterm $m_k$ is converted into a corresponding maxterm $M_k$ by negating the minterm's value. At the next stage, a negated form of the function $A_i$ is constructed in CNF as conjunction of maxterms $M_k$. Direct DNF function $A_i$ can be easily obtained from a corresponding negated form of the determined logical function by applying negation one more time.

The system for generating arbitrary continuous logical functions has to decide, which maxterm $M_k$ to include into the function NOT $A_i$ under construction. It can be done while analyzing the binary code of the index i for this function. If a certain digit of this code contains "one", a corresponding maxterm has to be included; if it contains "zero", then does not. It also necessary to decide which input signals $x_j$ should be participating in the building of the currently processed minterm $m_k$. An appropriate decision can be taken on the basis of analysis of the binary code of the minterm index k. If a corresponding digit of this code contains "one", a proper input signal $x_j$ has to be taken in its direct, and if it contains "zero"—in negated form.

Thus, disjunction of continuous variables, which is characterized by larger computation time is completely excluded from the process of the function evaluation. Assessed continuous logical functions become fully deterministic and compatible with appropriate discrete functions. Having this method standardized, uniform and deterministic continuous-valued logical functions can be constructed and used in various engineering applications.

A technical solution proposed in this patent is characterized by several new hardware and software features. It produces novel and unexpected results: i.e. deterministically defined and repeatable continuous logical functions that are executed at minimal time, and compatible with the discrete logic. These features are different than all previous and relevant prior art relating to generating arbitrary continuous-valued logical function of any number of input variables. Actually, the present invention is characterized by several method-step differences over prior developments, which lead to completely different hardware and software implementations.

However, the present invention's solution is not only novel but also unobvious. It successfully resolves a long-term problem that has not been solved yet. The CNF or DNF method of construction of the continuous-valued logical functions is not shown in any prior-art reference. Therefore, this approach's and method's differences are substantial and significant. Particularly, these features are consequences of several newly discovered relationships among such objects as continuous direct and negated logical functions, their minterms, maxterms, and underlying input variables that become immanent to the functions defined in DNF or CNF. These peculiar features are not only unobvious but also unexpected.

BRIEF DESCRIPTION OF THE DRAWINGS

A complete understanding of the present invention may be obtained by reference to the accompanying drawings, when considered in conjunction with the subsequent, detailed description, in which.

DRAWINGS—REFERENCE NUMERALS

For purposes of clarity and brevity, like elements, components, processes, and states will bear the same designations and numbering throughout the Figures. We use similar designations for both processes included in a flowchart and states compounding a state machine diagram. They are designated with numerals (like regular patent elements), with a capital letter "P" followed by a consequent number—for processes, and with a capital letter "S" followed by a consequent number—for states. Such designations also used for labels in pseudo-code of the equivalent computer program. In cases when certain conditions checked and, correspondingly, certain decisions taken, capital letters "A", "B", "C", and "D" are used for designation of these decision functions of the flowchart and for labels corresponding to statements in the appropriate pseudo-code lines. Boolean (discrete) logical variables corresponding to these decisions are designated with corresponding lower case letters "a", "b", "c", and "d". Boolean negation of these logical variables is designated with a symbol "\".

- 10-data input component
- 12-logical processing unit
- 14-data output component
- 16-control
- 18-input
- 20-output signal
- 22-index of logical function
- 24-number of input signals
- 30-start element (process P0 and state S0)
- 33-input of plurality $x_j$, n, and i element (process P1 and state S1)
- 46-initialize k and NOT $A_i$ element (process P2 and state S2)
- 48-get $i_k$ (process P3 and state S3)
- 50-check i element (decision B)
- 52-initialize j and $m_k$ element (process P4 and state S4)
- 53-get $k_j$ (process P5 and state S5)
- 54-check k element (decision D)
- 56-calculation maxterm element (process P6 and state S6)
- 58-alternative calculation minterm element (process P7 and state S7)
- 60-increment index j element (process P8 and state S8)
- 62-check j element (decision C)
- 64-calculate maxterm element (process P9 and state S9)
- 65-calculation negated function element (process P10 and state S10)
- 67-increment k element (process P11 and state S11)
- 69-check k element (decision A)
- 72-negate NOT $A_i$ element (process P12 and state S12)
- 76-output logical function $A_i$ element (process P13 and state S13)
- 77-end element (process P14 and state S14).

DESCRIPTION OF THE PREFERRED EMBODIMENT

Figure 1:
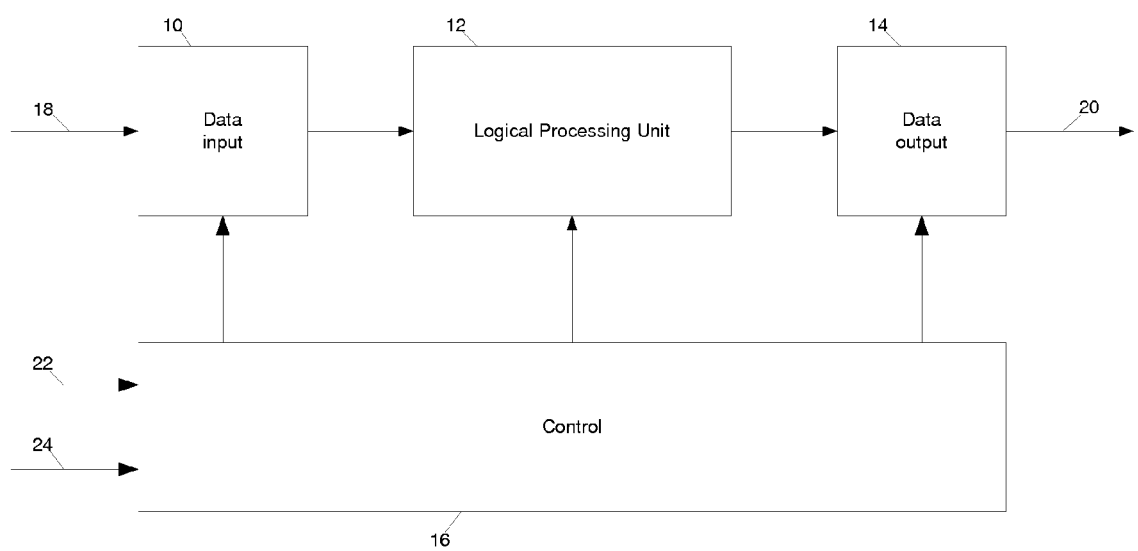
FIG. 1 is a block diagram view of a system for calculating values of continuous logical functions.

Generally, the proposed system (as it depicted in FIG. 1) receives a set of input signals $x_j$ 18 applied to the data input component 10. The data input feeds the logical processing unit 12. Its output is connected to data output component 14, which provides logical output signal $A_i$ 20. Operation of all three data path components are orchestrated by the control 16 component. The control 16 portion of the system receives two inputs: a number n of input signals 24 and an index i of logical function $A_i$ 22 that has to be generated. The data input component 10, logical processing unit 12, data output component 14, and control 16 can be implemented in software of a microcontroller, DSP, or general computer.

Figure 2:
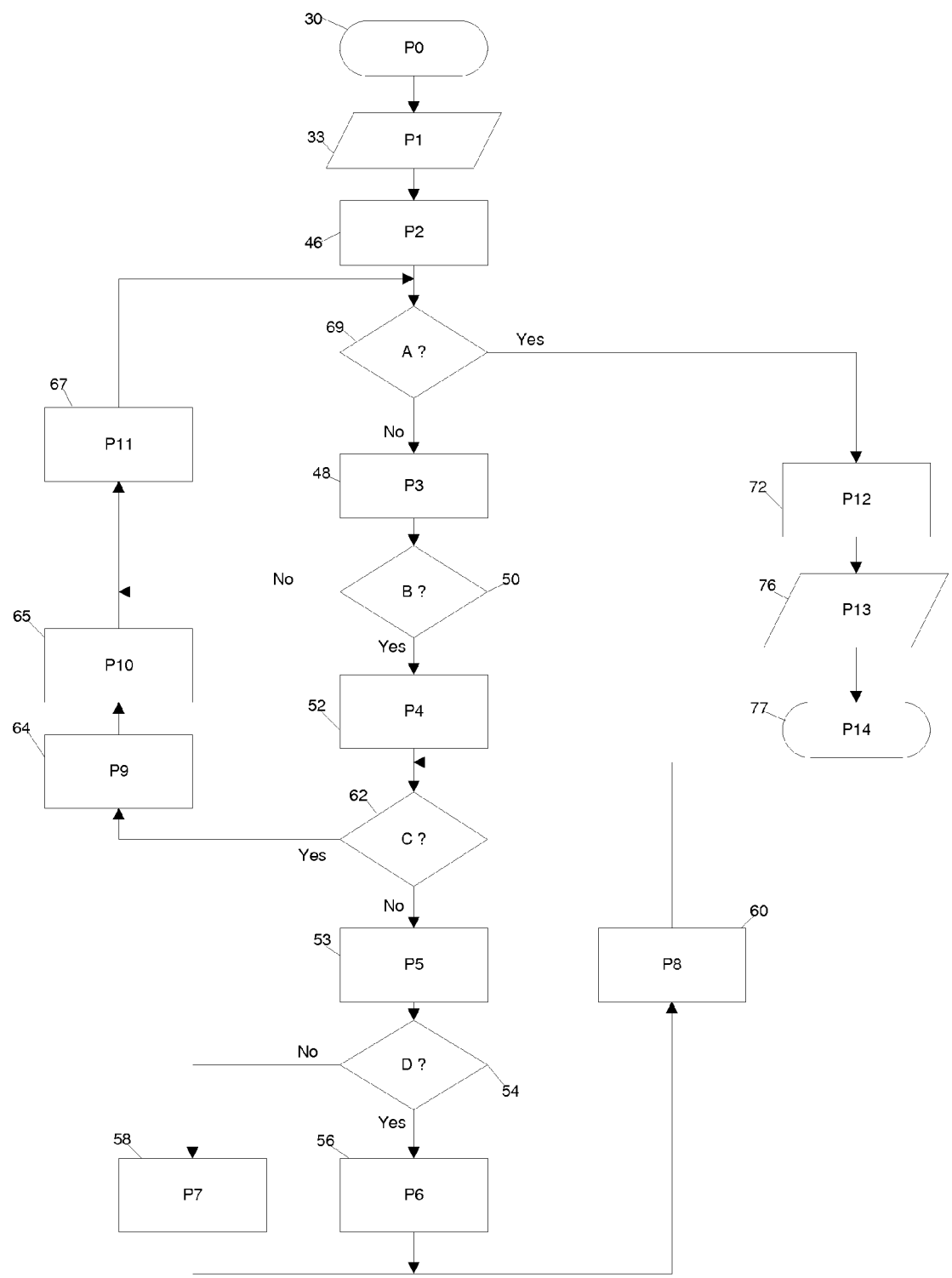
FIG. 2 is a flowchart view of a method for logical processing of continuous logical functions.

Further, an algorithm that illustrates principles of operation as it relates to defining continuous logical functions $A_i$ at software embodiment of this patent is depicted in a flowchart of FIG. 2. At this diagram:

Element 33 (process P1) inputs plurality of signals $x_j$, n, and i;

Element 46 (process P2) initializes (NOT $A_i$)=1 and k=0;

Element 48 (process P3) get a value of $i_k$;

Element 52 (process P4) initializes $m_k$=1 and j=0;

Element 53 (process P5) get a value of $k_j$;

Element 56 (process P6) is calculation of the minterm $m_k = m_k$ AND $x_j$;

Element 58 (process P7) is alternative calculation of the minterm $m_k = m_k$ AND (NOT $x_j$);

Element 60 (process P8) increments index j as j=j+1;

Element 64 (process P9) calculates maxterm as $M_k$=NOT $m_k$;

Element 65 (process P10) calculates negation of the continuous logical function (NOT $A_i$)=($M_k$) AND (NOT $A_i$);

Element 67 (process P11) increments index k as k=k+1;

Element 72 (process P12) calculates the continuous-valued logical function $A_i$ by negating the (NOT $A_i$);

Element 76 (process P13) outputs the calculated value of $A_i$.

On this diagram, the following Boolean logical conditions influence the flow control:

Decision A: If k=$2^n$ then a=1, else a=0;
Decision B: If $i_k$=1 then b=1, else b=0;
Decision C: If j=n then c=1, else c=0;
Decision D: If $k_{subj}$=1 then d=1, else d=0.

The input of plurality $x_j$, n, and i element 33 and Process P1 assumes that the number i can be inserted as a binary code or transformed from a decimal to a binary form. All values of variables $x_j$ are consequently inputted and stored in internal memory of the system. In cases of general computer, microcontroller, or DSP, it is a computer memory. This portion of the system can be supported by analog to digital converter incorporated in a microcontroller or DSP or by stand-alone data acquisition system. In certain cases, i.e. in a case of general computer software, these elements might not be needed, as all logical variables are accessible internally by the program; in this case the input of plurality $x_j$, n, and i element 33 and Process P1 operations have to be understood functionally. Finally, the system-computed value of continuous logical function $A_i$ is stored in internal computer memory and sent to the computer output device (for example, display or printer) or saved and sent to another program for later use.

Operation

Preferred Embodiment

Before logical processing starts, three internal variables have to be initialized (initialize k and NOT $A_i$ element 46 and Process P2) to values k=0 and NOT $A_i$=1, respectively. The next step of logical processing is to iterate the k-loop, at which element 48 and Process P3 gets a bit of the $i_k$ from memory and element 50 and Decision B checks $i_k$ while sensing whether the k-th binary digit of the code i is "one". In the case it is True, a certain minterm $m_k$ has to be considered. If this digit is equal to "zero", the index k is incremented and the next minterm is evaluated. This processing continues (increment k element 67 and Process P11) and analyzed (check k element 69 and Decision A) until the index k reaches its maximum value of $2^n$ (a number of minterms).

In a case the minterm has to be included, another internal loop, j-loop, is started. To initialize this loop, an index of input variable j is set to "zero" (initialize j element 52). After that, a binary digit of the index k is obtained by the element 53 and Process P5 and checked by the check $k_{subj}$ element 54 and Decision D. If this digit of the $k_j$ is equal to "one", then a corresponding minterm $m_k$ is calculated (calculation minterm element 56 and Process P6) as $m_k$=($m_k$) AND ($x_j$). Otherwise, the minterm is assessed as ($m_k$) AND (NOT $x_j$) (alternative calculation minterm element 58 and Process P7). Index j is incremented (by the increment index j element 60 and Process P8) until it becomes equal to a number of input variables n (check j element 62 and Decision C). Since an initial value of the minterm was previously set to "one" and the minterm is a conjunction (product) of input variables in their direct or negated form, after accounting for all binary digits of j, a value of the minterm $m_k$ is obtained. When all iterations of j-loop are completed, the minterm $m_k$ has been assessed.

At the next step, a value of the corresponding maxterm $M_k$ is calculated (calculation maxterm element 64 and Process P9) as $M_k$=NOT $m_k$. The function NOT $A_i$ while is assessed by calculating (NOT $A_i$)=(NOT $A_i$) AND ($M_k$) (calculation negated function element 65 and Process P10). After that, the control 16 is transferred to the next minterm $m_k$ iteration—to the increment k element 67 and Process P11. When all values of k processed (which is verified by check k element 69 and Decision A), the loop is exit. At this point a final value of the NOT $A_i$ has been accumulated. Since the initial value of the function NOT $A_i$ is "one" and every conjunction is a multiplication of a value of the function by the appropriate maxterm, a negated value of the continuous logical function $A_i$ has been determined. Finally, the output component calculates the logical function $A_i$ while applying an operation of negation to the logical function NOT $A_i$ (element 72 and Process P12). This value is sent to the system output (output logical function $A_i$ element 76 and Process P13).

Here is pseudo-code corresponding to the preferred embodiment of this patent:

```
           input all x.sub.j, n, and i
           numterms = 2pwr(n)
           notAi = 1
           k = 0
A:         if k = numterms then go to P12
           end if
P3:        read i(k)
B:         if i(k) = 1 then go to P4
           else go to P11
           end if
P4:        j = 0
           m(k) = 1
```

| | |
|---|---|
| C: | if j = n then go to P9 |
| | end if |
| P5: | get k(j) |
| D: | if k(j) = 1 then go to P6 |
| | else go to P7 |
| | end if |
| P6: | m(k) = m(k) * x(j) |
| | go to P8 |
| P7: | m(k) = m(k) * (1 − x(j)) |
| P8: | j = j + 1 |
| | go to C |
| P9: | M(k) = 1 − m(k) |
| | notAi = notAi * M(k) |
| P11: | k = k + 1 |
| | go to A |
| P12: | A(i) = 1 − notAi |
| | output A(i) |
| | end |

Description

Alternative Embodiment

A block diagram of the alternative embodiment of the proposed system (as it also depicted in FIG. 1) comprises of the similar elements, 10, 12, 14, and 16. The data input component 10, logical processing unit 12, and data output component 14 can be implemented as electronic circuits in digital or analog form. At this embodiment, the control 16 portion of the system is digital and is implemented as an electronic circuit. Accordingly, all four components can be built in hardware as analog or digital or mixed-signal integrated circuits.

The control 16 portion of the system receives two inputs: a number n of input signals 24 and an index i of logical function $A_i$ 22 that has to be generated. The input assumes that the number i can be inserted as a binary code or transformed from a decimal to a binary form. Initially, the number of input variables n, all values of variables $x_j$ are consequently inputted and stored in internal memory of the system. In a case of digital IC, it is a plurality of registers or memory circuits while in a case of analog IC, it is a plurality of sample and hold circuits. This portion of the system can be supported by analog to digital converter or by stand-alone data acquisition system. Finally (after completing all processing), the calculated value of $A_i$ is stored in internal memory of the IC, which is an output register, or a memory circuit, or a sample and hold circuit, and sent to this system's output (output logical function $A_i$ element 76 and State S13).

Figure 3:
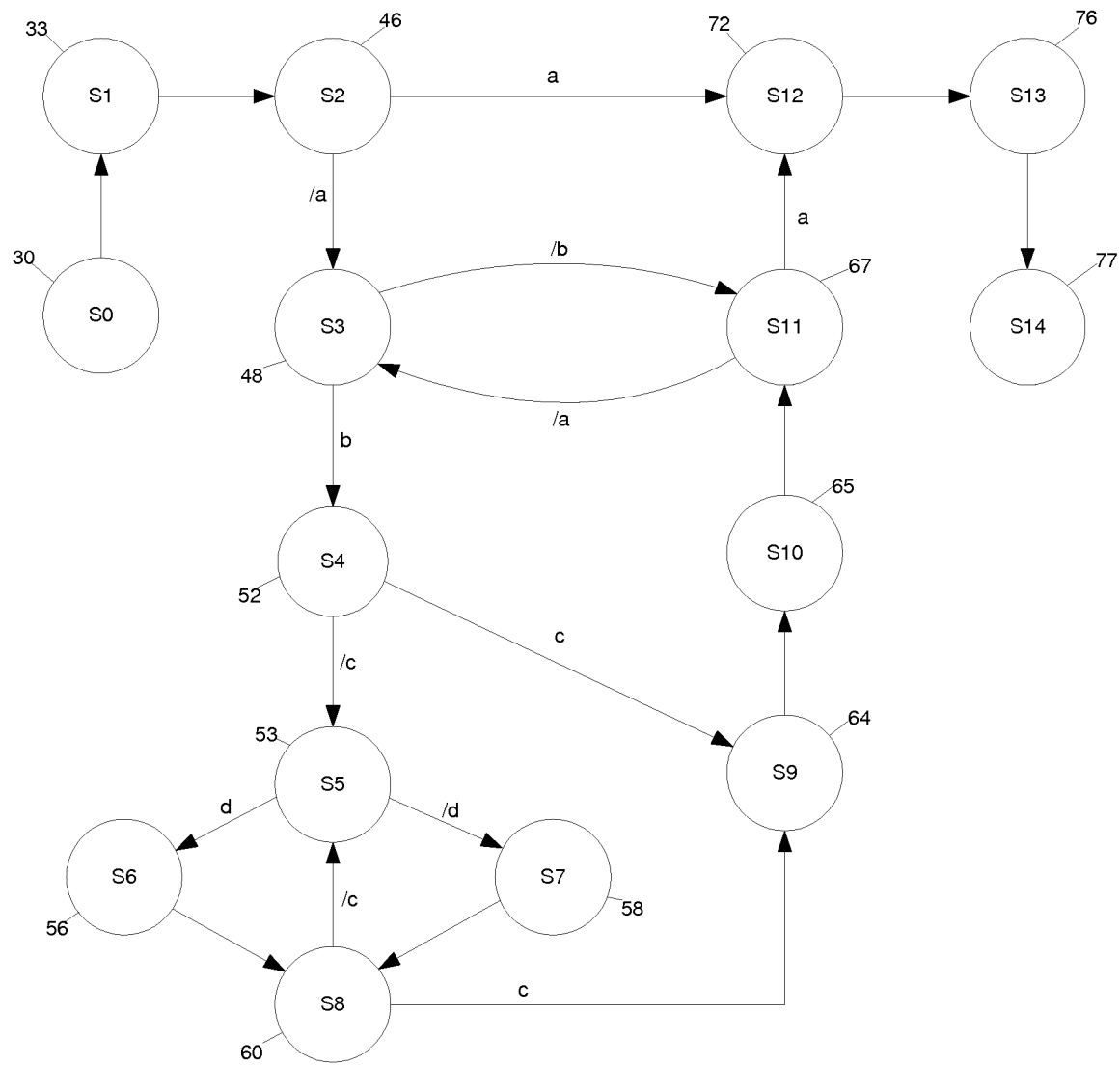
FIG. 3 is a state machine diagram of a continuous logical processing integrated circuit.

In order to support the underlying algorithm of logical processing, the hardware (IC) solution has to be implemented as a finite state machine. Such automata can be synthesized while using such hardware description language as VHDL or Verilog. Further, a finite state machine diagram (depicted in the FIG. 3) is described which illustrates the principles of operation as it relates to defining continuous-valued logical functions in a case of hardware embodiment of this patent. While considering hardware (microcircuit) implementation, several elements of the flowchart (of FIG. 2) correspond to the states of the finite automata. Transitions of the underlying state machine are based on checking the same partial discrete logical signals a, b, c, and d, as above.

At the state machine diagram:

Element 33 (state S1) inputs plurality of signals $x_j$, n, and i;

Element 46 (state S2) initializes (NOT $A_i$)=1 and k=0;

Element 48 (state S3) gets a value of $i_k$;

Element 52 (state S4) initializes $m_k$=1 and j=0;

Element 53 (state S5) gets a value of $k_j$;

Element 56 (state S6) is calculation of the minterm $m_k = m_k$ AND $x_j$;

Element 58 (state S7) is alternative calculation of the minterm $m_k = m_k$ AND (NOT $x_j$);

Element 60 (state S8) increments index j;

Element 64 (state S9) calculates maxterm as $M_k$=NOT $m_k$;

Element 65 (state S10) calculates negation of the continuous logical function (NOT $A_i$)=($M_k$) AND (NOT $A_i$);

Element 67 (state S11) increments index k;

Element 72 (state S12) calculates the continuous-valued logical function $A_i$ by negating the (NOT $A_i$);

Element 76 (state S13) outputs the calculated value of $A_i$.

Transitions from one state to another are dependent on the following Boolean logical conditions and decisions:

Decision A: If $k=2^n$ then a=1, else a=0;
Decision B: If $i_k$=1 then b=1, else b=0;
Decision C: If j=n is then c=1, else c=0;
Decision D: If $k_{subj}$=1 then d=1, else d=0.

The state machine supports the following transitions:
From the state S0 to the state S1, unconditionally;
From the state S1 to the state S2, unconditionally;
From the state S2 to the state S12, if a is True;
From the state S2 to the state S3, if a is False;
From the state S3 to the state S4, if b is True;
From the state S3 to the state S11, if b is False;
From the state S4 to the state S9, if c is True;
From the state S4 to the state S5, if c is False;
From the state S5 to the state S6, if d is True;
From the state S5 to the state S7, if d is False;
From the state S6 to the state S8, unconditionally;
From the state S7 to the state S8, unconditionally;
From the state S8 to the state S9, if c is True;
From the state S8 to the state S5, if c is False;
From the state S9 to the state S10, unconditionally;
From the state S10 to the state S11, unconditionally;
From the state S11 to the state S3, if a is False;
From the state S11 to the state S12, if a is True;
From the state S12 to the state S13, unconditionally;
From the state S13 to the state S14, unconditionally.

Operation

Alternative Embodiment

Operation of the state machine is very similar to the operation of software version of the continuous-logical processor constructed according to this invention.

Strictly, logical processing starts from state S2 (initialization of internal variables NOT $A_i$ and k element 46). After that, if after obtaining a value of $i_k$ (by element 48 and State S3), the check $i_k$ shows that the k-th binary digit of the code i is "one", the transition is to the state S4 (initialize variables $m_k$ to 1 and k to 0 element 52). In a case this digit is equal to "one", a certain minterm $m_k$ is evaluated. A binary digit of the index k is obtained (element 53 and State S5) and checked. If this digit of the $k_{subj}$ is equal to "one", then a corresponding minterm $m_k$ is calculated at the calculation minterm state S6 (element 56) as $m_k$= ($m_k$) AND ($x_j$). Otherwise, the minterm is assessed as ($m_k$) AND (NOT $x_j$) at the alternative calculation minterm state S7 (element 58). Index j is incremented at the increment index j state S8 (element 60) until it becomes equal to a number of input variables n.

Since an initial value of the minterm was previously set to "one" and the minterms are conjunctions (products) of input variables in their direct or negated form, after accounting for all binary digits of j, a value of the minterm m.sub.k is obtained. When this loop of all values of j is completed, thus at state S9, a value of the corresponding maxterm M.sub.k is calculated (element 64, calculation maxterm M.sub.k) as a negated form of the minterm m.sub.k. At state S10, the function NOT A.sub.i is evaluated while calculating (NOT A.sub.i)=(NOT A.sub.i) AND (M.sub.k) (calculation negated function element 65). Since the initial value of the function NOT A.sub.i is "one" and every conjunction is a multiplication of a value of the function by the appropriate maxterm, thus a negated value of the continuous logical function A.sub.i has been determined. After that, the control 16 is transferred to the next loop of k—to state S11 (the increment k element 67). When all values of k passed, this loop is exited. At this point, a final value of the maxterm M.sub.k has been accumulated.

If the digit i.sub.k is equal to "zero", the index k is incremented and the next minterm is considered. This k-loop iteration continues to state S11 (increment k element 67) and tested by (check k state logical expression), until the index k reaches its maximum value of $2^n$ (a number of minterms m.sub.k).

Finally at state S12, the output component calculates the logical function A.sub.i while applying an operation of negation to the logical function NOT A.sub.i (element 72 and State S12). This value is sent to the element 76 and state S13, which is the output of logical function A.sub.i.

Conclusion, Ramifications, and Scope

Since other modifications and changes aimed to fit particular operating requirements and environments will be apparent to those skilled in the art, the invention is not limited to the example(s) chosen for purposes of disclosure, and should covers all changes and modifications, provided they do not constitute a departure from true spirit and scope of this invention.

Furthermore, the reader will see that, according to one embodiment of the invention, a flowchart for microcontroller, microprocessor, DSP, or general computer software have been provided, which accomplishes any required kind of logical processing of continuous-valued logical signals, while delivering complete determinism, compatibility with discrete logic, and high speed of operation.

While the above description contains many specificities, these should not be construed as limitations on the scope of any embodiment, but as examplifications of various embodiments thereof. Many other ramifications and variations are possible within the teachings of the various embodiments. For example, this invention can be implemented in a form of a microcircuit. According to alternative embodiment of this invention, a finite state machine diagram is provided for constructing, digital or mixed-signal IC, necessary to execute any kind of logical processing, while delivering complete determinism, compatibility with discrete logic, and high speed of operation.

Thus the scope should be determined by the appended claims and their legal equivalents, and not by the examples given. Having thus described the invention, what is desired to be protected by Letters Patent is presented in the subsequently appended claims.

I claim:

1. A method for logical processing of continuous-valued logical signals, comprising:
    (a) providing means for input plurality of logical signals x.sub.j, index i of a direct logical function A.sub.i to be assessed, and a number n of said logical signals x.sub.j,
    (b) providing means for storing said logical signals x.sub.j, said index i, said number n, a maxterm M.sub.k, a minterm m.sub.k, a negated logical function NOT A.sub.i, and said direct logical function A.sub.i in internal memory,
    (c) providing means for output a value of said direct logical function A.sub.i and said negated logical function NOT A.sub.i,
    (d) providing means for control which orchestrates operation of the system,
    (e) providing a logical processing unit which will:
        (i) fulfill basic logical conjunction operation AND as a product of multiplication of two signals applied to inputs of said operation AND and for fulfilling logical negation operation NOT as a difference between 1 and a value of the signal applied to an input of said operation NOT,
        (ii) initialize said negated logical function NOT A.sub.i to 1, an index k of said minterm m.sub.k to 0, and index k of said maxterm M.sub.k to 0,
        (iii) in an external loop, calculate said negated logical function NOT A.sub.i by representing said index i of said logical function A.sub.i in binary form, obtaining said k-th binary digit of said index i, and consequently applying said AND operation to predetermined said negated logical function NOT A.sub.i and said maxterm M.sub.k only in a case if said k-th binary digit of said index i is equal to 1, in which case to activate an internal loop to assess a new value of said maxterm M.sub.k,
        (iv) after running said external loop $2^n$ times, calculate said direct logical function A.sub.i associated with said negated logical function NOT A.sub.i by applying said operation NOT to said negated logical function NOT A.sub.i,
        (v) initialize an index j of said input variable x.sub.j to 0 and said minterm m.sub.k to 1,
        (vi) in said internal loop, calculate said minterm m.sub.k by representing said index k of said minterm m.sub.k in binary form, obtaining said j-th binary digit of said index k, consequently executing said AND operation on predetermined value of said minterm m.sub.k and, if said j-th binary digit of said index k equal to 1, then on said input variable x.sub.j, else if said j-th binary digit of said index k is equal to 0, then on said input variable x.sub.j after applying to it said logical operation NOT,
        (vii) after running said internal loop said n times, calculate said maxterm M.sub.k by applying said operation NOT to a value of said minterm m.sub.k to determine said maxterm M.sub.k associated with said minterm m.sub.k,
    wherein any arbitrary continuous-valued logical functions of arbitrary number of input variables are calculated in real time, and logical functions are defined deterministically, unique, and are compatible with corresponding discrete logical functions, and
    wherein results of calculations are repeatable and computation time is substantially decreased due to exclusion of disjunction operations.

2. The method for logical processing of continuous-valued logical signals as recited in claim 1 wherein providing said logical processing is implemented in computer software.

3. The method for logical processing of continuous-valued logical signals as recited in claim 2 wherein providing said logical processing is implemented in said software of a general computer.

4. The method for logical processing of continuous-valued logical signals as recited in claim 2 wherein providing said logical processing is implemented in said software of a microprocessor.

5. The method for logical processing of continuous-valued logical signals as recited in claims 2 wherein providing said logical processing is implemented in said software of a microcontroller.

6. The method for logical processing of continuous-valued logical signals as recited in claim 2 wherein providing said logical processing is implemented in said software of a digital signal processor.

7. The method for logical processing of continuous-valued logical signals as recited in claim 1 wherein providing said logical processing is implemented in hardware of a microcircuit as a finite state machine.

8. The method for logical processing of continuous-valued logical signals as recited in claim 7 wherein providing said logical processing is implemented in digital form, said data input supports analog to digital conversion while said data output supports digital to analog conversion, said conjunction operation AND is implemented using a digital multiplier while said NOT operation is implemented while using a digital difference circuit, and said memory is implemented as a digital random-access memory.

9. The method for logical processing of continuous-valued logical signals as recited in claim 7 wherein providing said logical processing is directly implemented in analog form, said conjunction operation AND is implemented using an analog multiplier while said NOT operation is implemented while using an analog difference circuit, and said memory is implemented as a plurality of sample and hold circuits.

\* \* \* \* \*